No. 680,030. Patented Aug. 6, 1901.
J. EMANS.
CORN HUSKING IMPLEMENT AND TWINE CUTTER.
(Application filed Nov. 14, 1900.)
(No Model.)
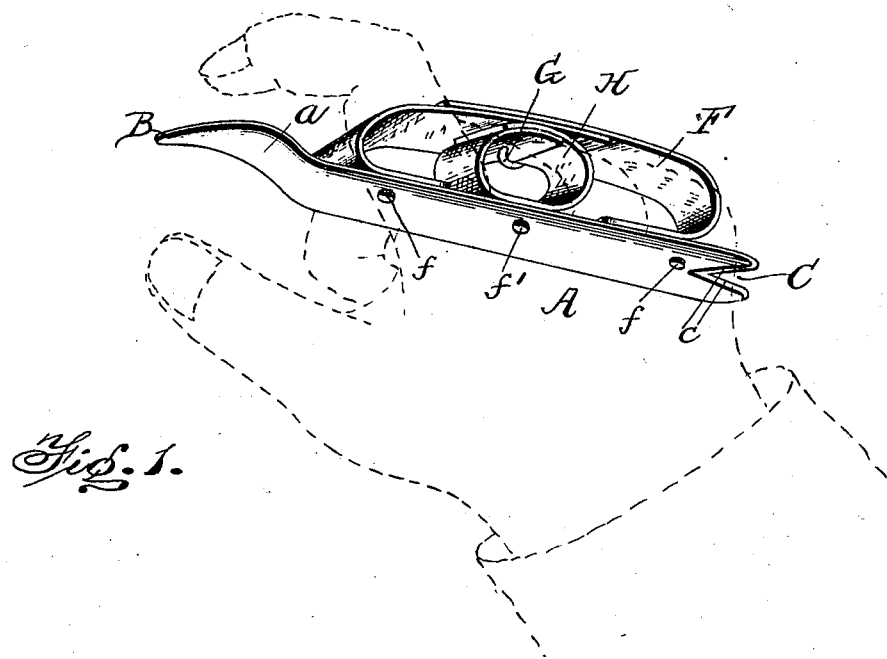
Fig. 1.
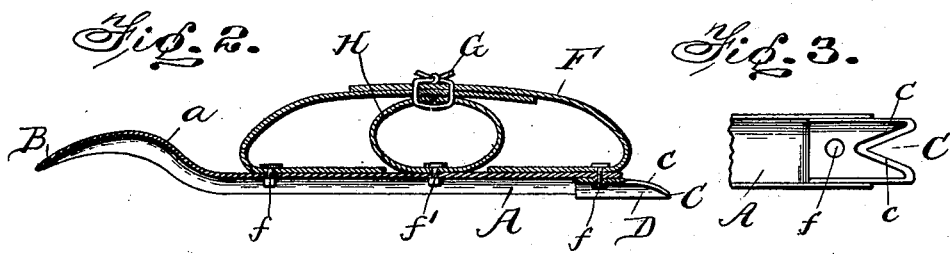
Fig. 2.
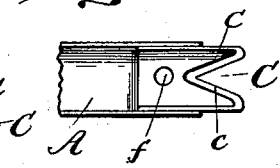
Fig. 3.
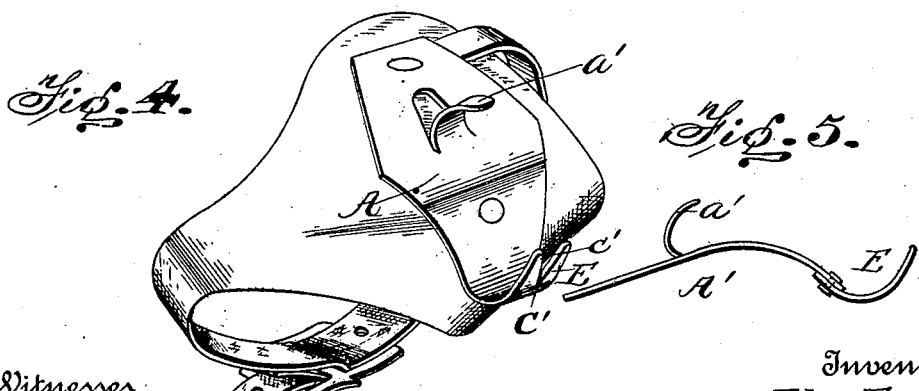
Fig. 4.
Fig. 5.
Witnesses
Marcus L. Byng.
E. H. Bond
Inventor
John Emans,
By. Albert Popkins,
His Attorney
THE NORRIS PETERS CO., PHOTO-LITHO., WASHINGTON, D. C.

UNITED STATES PATENT OFFICE.

JOHN EMANS, OF OTTAWA, OHIO.

CORN-HUSKING IMPLEMENT AND TWINE-CUTTER.

SPECIFICATION forming part of Letters Patent No. 680,030, dated August 6, 1901.

Application filed November 14, 1900. Serial No. 36,473. (No model.)

*To all whom it may concern:*

Be it known that I, JOHN EMANS, a citizen of the United States, residing at Ottawa, in the county of Putnam and State of Ohio, have invented certain new and useful Improvements in Corn-Husking Implements and Twine-Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in husking implements of that character which are held upon the hand by a strap or other means and consist of a piece of steel or other metal shaped to form a husking-pin.

The present invention has for its object, primarily, to so construct the implement as to combine therein not only a husking-pin, but a cutter for severing the twine that binds the corn. The cutter is disposed at one end of the implement and is rigid therewith, in contradistinction to a blade which is pivotally mounted thereon. It is disposed in such position as to be most convenient in use. The cutter may be integral with the husking implement or it may be in a separate piece and rigidly yet detachably secured thereto.

The invention is capable of embodiment in various forms, some only of which are herein illustrated.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a perspective view showing the implement applied to a hand. Fig. 2 is a substantially central longitudinal section through the implement. Fig. 3 is a detail showing the detachable cutter. Fig. 4 is a perspective view showing another form of husking implement embodying the invention. Fig. 5 is an edge view of the implement seen in Fig. 5 removed from its attaching-strap.

Like letters of reference indicate like parts throughout the several views.

Referring now to the details of the drawings by letter, A designates the implement proper, formed of a piece of steel or other suitable metal of substantially the shape seen in Figs. 1 and 2, being preferably arc-shaped in cross-section to give greater strength and at one end bent out of the plane of the body portion, as seen at *a*, and curved to form the husking-peg B, the end of which is tapered, as seen in Figs. 1 and 2. The other end of the body portion is provided with a substantially V-shaped notch C, the side walls of which are beveled and sharpened, as seen at *c*, to form cutting edges by which the twine-bands that bind the corn may be readily severed. This cutter may instead of being formed integral with the body portion be formed separately, as seen at D, and secured thereto in any suitable manner so as to be detached when it may be desired to sharpen its cutting edges or to replace it by a new one when worn out. Any suitable means may be employed for affixing the detachable cutter in place.

In Figs. 4 and 5 I have shown another form of husking implement which, however, embodies the same general features. In this form the plate A' is broadened and has the husking peg or hook *a'* struck up therefrom, while the cutter C', with its cutting edges *c'*, is formed by bending up the end of the material, as shown, or the cutter in this form may also be made separate from and secured to the end of the body portion, as seen in Fig. 5, where the cutter is represented at E and is seen as suitably secured to the end of the body portion or plate A'. It may be more or less curved, as may be found most expedient.

In all of the forms of the invention the same generic idea is present—that of a husking peg or hook at or near one end of the body portion and a cutter at the other end and this cutter rigid instead of being pivotally mounted thereon. By means of such construction the operator is able to perform the husking operation without interference on the part of the cutter, while when the twine or band is being cut the fingers of the hand are free to perform other offices, such as grasping a stalk, if the cutter is being used to cut the shock-band, or for holding the twine, if the cutter is used to cut off the twine after the shock has been made and tied. Furthermore, the cutter being located at the opposite end and rigidly connected to the pin and in alinement with the husking-peg, the hand of the operator need not be carried to an unnatural position when making the cut, the cutter being located at a point where it will naturally be brought into its proper position for use. Furthermore, in view of the usual requirement of the use of two independent tools (a husking-pin and a knife) in husking operations, the knife serving to first cut the band, followed by the husking-pin removing the ear, and then the requirement of the knife to sever the bundled fodder by the cutting of the twine connection with the ball of twine, it will be obvious that with the two combined in a single implement, each in a position to be operated without changing the position of the hand or implement in the hand, it is not only a time-saving implement, in that there is no requirement of a dropping of one tool for the other, but the arrangement of the pin and cutter in substantial alinement enables a more rapid operation, as there is no requirement whatever of a change of position of the tool or implement in performing either of the operations, the general position of the hand being the same in both, so that each operation can be performed without manipulation of the body portion.

The implement is attached to a strap or holding device of any desired form. In Figs. 1 and 2 the strap F has its ends attached to the body portion or plate by suitable rivets $f$ and the other ends of this strap or two-part strap united at the center of the plate, as by the cord G, which serves also to secure the ends of a supplemental strap H, which is secured to the plate or body A, as by a rivet $f'$. This forms receptacles for three fingers, and the straps may be adjusted to vary the size of the openings, as will be readily understood. As seen in Fig. 2, the rivet or bolt that holds the rear end of the strap to the body serves also to hold the detachable cutter in place. In Fig. 4 the plate or body is affixed to a different form of holding device, which of itself is common in this art.

The use of the implement and its advantages will be readily understood and appreciated from the above description when taken in connection with the annexed drawings, and a further detailed description thereof is not deemed necessary.

What is claimed as new is—

The herein-described husking implement consisting of a blade of metal terminating at one end in a husking-peg, a cutter arc-shaped in cross-section, fitted in the blade at the other end and extended beyond such end, straps attached at one end to said blade near opposite ends thereof with their other ends overlapped, a supplemental strap secured at its center to the center of the blade between the fastened ends of and the points of attachment of the first-mentioned straps, with its free ends both disposed beneath the overlapped ends of the first-mentioned straps, and a fastening device as the cord G passed through the ends of the central strap and through the overlapped free ends of the first-mentioned straps, all substantially as shown and described.

In testimony whereof I affix my signature in presence of two witnesses.

JOHN EMANS.

Witnesses:
JAMES P. LEUSURE,
C. A. FREY.